(12) United States Patent
Owens

(10) Patent No.: US 12,349,689 B2
(45) Date of Patent: Jul. 8, 2025

(54) FREEZE-DRYING, STORING, REHYDRATING AND FEEDING USING BREAST MILK

(71) Applicant: Madeline Owens, Salt Lake City, UT (US)

(72) Inventor: Madeline Owens, Salt Lake City, UT (US)

(*) Notice: Subject to any disclaimer, the term of this patent is extended or adjusted under 35 U.S.C. 154(b) by 0 days.

(21) Appl. No.: 18/146,963

(22) Filed: Dec. 27, 2022

(65) Prior Publication Data

US 2023/0255222 A1 Aug. 17, 2023

Related U.S. Application Data

(63) Continuation of application No. 16/731,521, filed on Dec. 31, 2019, now Pat. No. 11,533,926.

(60) Provisional application No. 62/786,763, filed on Dec. 31, 2018.

(51) Int. Cl.
| | | |
|---|---|---|
| A23C 3/05 | (2006.01) |
| A23B 11/145 | (2025.01) |
| A23C 1/08 | (2006.01) |
| A23C 9/16 | (2006.01) |
| A23C 9/20 | (2006.01) |

(52) U.S. Cl.
CPC ............ *A23B 11/1455* (2025.01); *A23C 1/08* (2013.01); *A23C 9/16* (2013.01); *A23C 9/206* (2013.01); *A23V 2300/10* (2013.01); *A23V 2300/20* (2013.01)

(58) Field of Classification Search
CPC .. A23C 3/055; A23C 1/08; A23C 9/16; A23C 9/206; A23V 2300/10; A23V 2300/20
USPC ......................................................... 426/384
See application file for complete search history.

(56) References Cited

U.S. PATENT DOCUMENTS

| | | |
|---|---|---|
| 2,885,788 A | 5/1959 | Leviton |
| 3,020,645 A | 2/1962 | Copson |
| 3,048,928 A | 8/1962 | Copson et al. |
| 3,286,366 A | 11/1966 | Seligman |
| 3,313,032 A | 4/1967 | Malecki |
| 3,454,178 A | 7/1969 | Bender et al. |
| 5,964,043 A | 10/1999 | Oughton et al. |
| 2002/0139767 A1* | 10/2002 | Budd ................. A47G 19/2272 215/11.1 |
| 2009/0113753 A1 | 5/2009 | Pepper et al. |
| 2017/0164630 A1* | 6/2017 | DiMauro ............. A61M 1/064 |

* cited by examiner

*Primary Examiner* — Brent T O'Hern
(74) *Attorney, Agent, or Firm* — Morriss O'Bryant Compagni Cannon, PLLC.

(57) ABSTRACT

The present invention is a system and method for performing freeze drying of small quantities of a liquid for personal use, wherein a liquid material is disposed within a single-use container, the container is then coupled to a small-scale freeze-drying unit which extracts liquid from the material in the container using a freeze-drying process, and the freeze-dried material is then left in the container and the container is stored until rehydration. The container may be a specialized single-use container that may be used to rehydrate the liquid and then fitted with a delivery device to feed an infant or child.

9 Claims, 16 Drawing Sheets

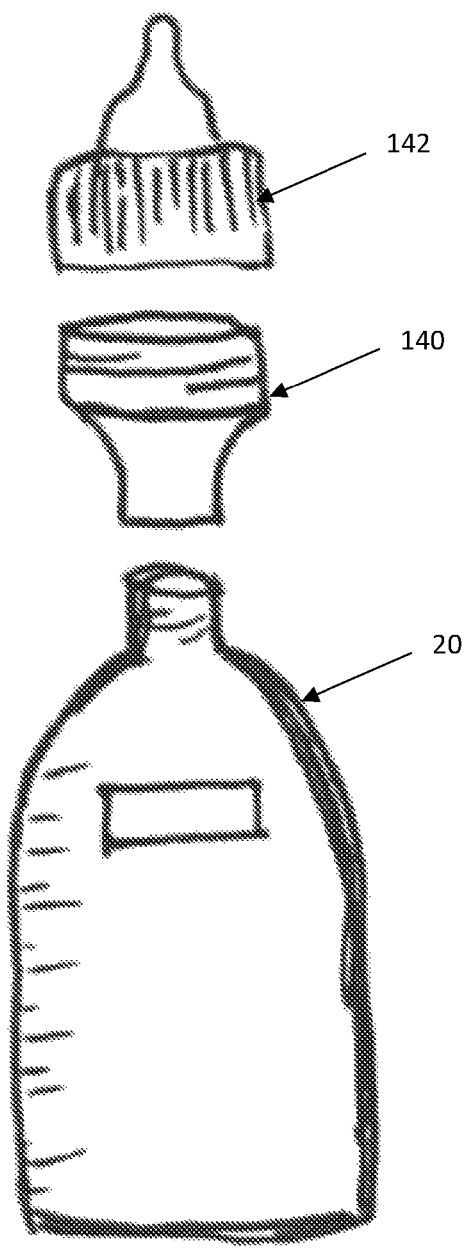
FIGURE 13A
FIGURE 13B

FREEZE-DRYING, STORING, REHYDRATING AND FEEDING USING BREAST MILK

BACKGROUND

Field of the Invention

This invention relates generally to lyophilization or freeze-drying of a mostly liquid material or any solid material that contains liquid. More specifically, the present invention is directed to a method of freeze-drying of breast milk that enables a user to be able to preserve small quantities of breast milk for later use, wherein the user may be a mother who is saving breast milk for later use for an infant, and containers that may be used to feed an infant or child a freeze-dried product.

Description of Related Art

The commercial industry provides freeze-drying units that operate to freeze-dry large quantities of materials that are both solid and mostly liquid. Commercial units may be used in the food and pharmaceutical industries to provide a means of saving perishable materials.

Freeze-drying is a technique of dehydration which utilizes low pressure, low temperature environments to induce the sublimation of water content from a material. In contrast, dehydration removes water using heat and may compromise the material that is trying to be preserved. Liquids may be particularly compromised by a heating dehydration process and therefore may be unsuitable for preserving breast milk.

There are various large-scale means for freeze-drying breast milk. These processes are shown in the prior art and incorporate the use of large freeze-drying units that are expensive, difficult to operate and occupy a significant amount of space. These large-scale units are thus unsuitable for performing freeze drying on a small scale for personal use.

Accordingly, it would be an advantage over the prior art to provide a small-scale freeze-drying unit that is capable of freeze-drying small quantities of a mostly liquid material in a container that may be used to rehydrate the liquid material for immediate use.

Once the breast milk has been freeze-dried, it would also be an advantage over the prior art to provide a system and method for rehydrating the breast milk using a convenient single-use container that may be recycled or a container that can be cleaned and re-used.

BRIEF SUMMARY

The present invention is a system and method for performing freeze drying of small quantities of a liquid for personal use, wherein a liquid material is disposed within a single-use container, the container is then coupled to a small-scale freeze-drying unit which extracts liquid from the material in the container using a freeze-drying process, and the freeze-dried material is then left in the container and the container is stored until rehydration. The container may be a specialized single-use container that may be used to rehydrate the liquid and then fitted with a delivery device to feed an infant or child.

In a first aspect of the invention, the small-scale freeze-drying unit is only capable of performing the freeze-drying process on a single-use container.

In a second aspect of the invention, the small-scale freeze-drying unit is capable of performing the freeze-drying process on more than one single-use container at a time.

In a third aspect of the invention, a single-use container may be a baby bottle that is optimized for the freeze-drying, rehydrating and feeding of an infant or child.

In a fourth aspect of the invention, a large-scale freeze-drying unit may be modified to accept single-use containers that are held at an angle that optimizes the freeze-drying process in the larger units.

In a fifth aspect of the invention, a spray drying system is optimized for freeze-drying breast milk.

In a sixth aspect of the invention, a specialized single-use container is formed as a squeezable pouch that is adapted to receive a rehydrating liquid, and then coupled to a delivery device for feeding an infant or child.

These and other embodiments of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 13A is a profile view of the single-use container, the accessory adapter and a serving accessory before they are assembled.

FIG. 13B is a profile view of the single-use container, the accessory adapter and a serving accessory after they are assembled.

DETAILED DESCRIPTION

Reference will now be made to the drawings in which the various embodiments of the present invention will be discussed so as to enable one skilled in the art to make and use the invention. It is to be understood that the following description illustrates embodiments of the present invention and should not be viewed as narrowing the claims which follow.

Figure 1:
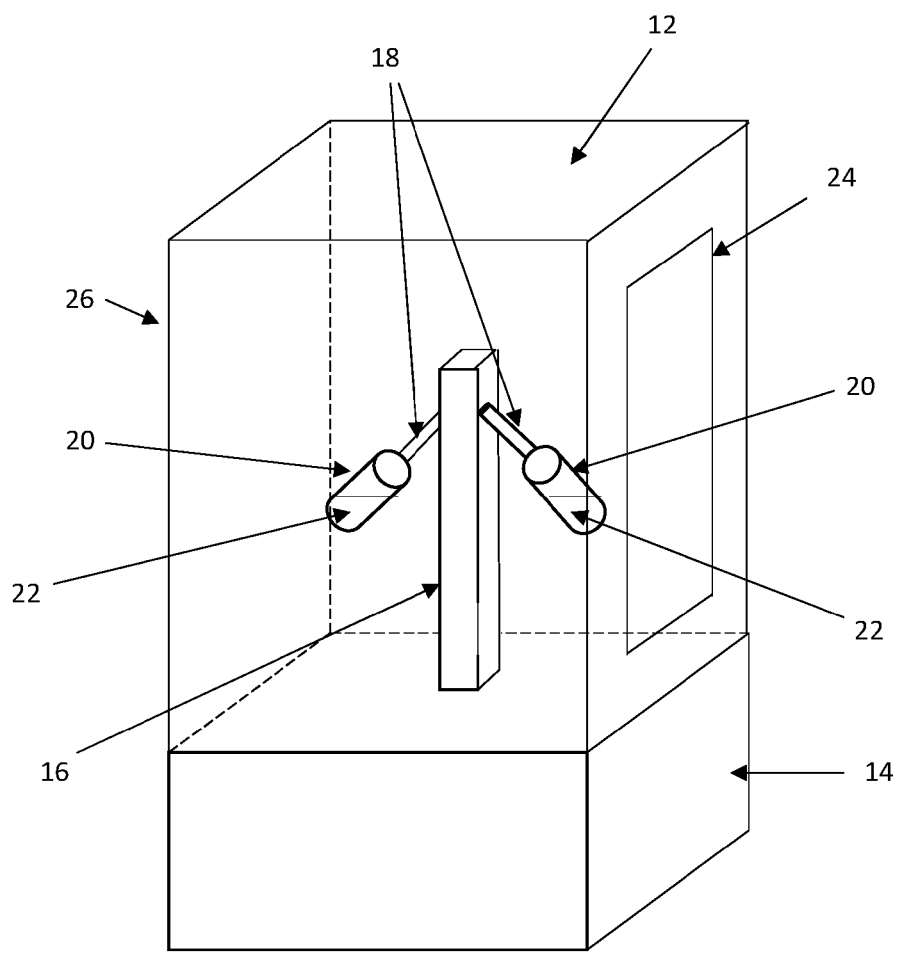
FIG. 1 is a small-scale freeze-drying unit that may be implemented for use in a non-commercial setting.

FIG. 1 is diagram of the components of a first embodiment of the invention. This figure shows a small freeze-drying unit 10 having a top half 12 and a bottom half 14. The top half 12 of the unit 10 includes a chamber 26 where the freeze-drying process is performed.

FIG. 1 shows in a cut-away view a central pole 16 upon which are disposed one or more extensions 18 that are coupled to the central pole. The extensions 18 may be coupled to a top of the central pole 16 or attached anywhere along a length thereof. The extensions 18 may be disposed at an angle to the central pole 16. The function of the angle may be to maximize a surface area of a liquid material 22 disposed within a container 20 that is mounted on an end of each of the extensions 18, and thereby facilitate the freeze-drying process. The number of extensions may be increased or decreased without changing the scope of the invention.

The bottom half 14 of the freeze-drying unit 10 may be comprised of a vacuum pump and a freezing unit (not shown). The freeze-drying process may remove 98% or more of the liquid from the liquid material 22 being freeze-dried.

Operation of the first embodiment shown in FIG. 1 may proceed as follows. First, the liquid material 22 is disposed within the container 20. The container 20 may then be coupled to one of the extensions 18. The extensions 18 may provide a seal such that a vacuum or near vacuum may be created within the container 20. Thus, the central pole may include a connection between a vacuum pump in the bottom half 14 of the unit 10, and the extension 18 in order to create the desired vacuum within the container 20.

The liquid material 22 within the container 20 is then frozen by closing a door 24 on the top half 12 of the freeze-drying unit 10 and turning on the freezing unit within the bottom half 14.

The liquid material 22 may be frozen to whatever temperature is appropriate for performing the freeze-drying process. For example, the liquid material 22 may be frozen to a temperature of −40 degrees Fahrenheit or colder.

Once the liquid material 22 in the container 20 is frozen, the freeze-drying process removes frozen liquid from the now frozen material 22 within the container 20. The freeze-drying process may include the step of creating a vacuum or near vacuum below 4 mm Hg within the container 20. This vacuum is generated by the vacuum pump within the bottom half 14 of the freeze-drying unit 10 which is coupled to the central pole 16 and extends to one or more of the extensions 18 and to one or more containers 20 disposed on the extensions.

The freeze-drying process is well understood by those skilled in the art and is not considered a novel part of the invention and does not require further explanation. It is enough to state that the freeze-drying process removes frozen moisture from the formerly liquid material 22 in the container 20 until only a substantially dried residue remains within the container. The freeze-drying process may then be terminated.

The container 20 may then be removed from the extension 18 to which it is coupled. A cap (not shown) is placed on the container 20, and the container is then stored in a manner that is consistent with the storage of freeze-dried materials.

One advantage of the first embodiment may be that the freeze-dried material 22 remains in the container 20 in which the freeze-drying process was performed. In one or more embodiments of the invention, the container 20 may be a bottle that is used to feed an infant after the placement of a baby bottle nipple on the container and the contents of the container are rehydrated. Accordingly, if the freeze-dried material 22 is breast milk, there is little chance of contamination of the freeze-dried breast milk because it is never removed from the container before use.

Figure 2:
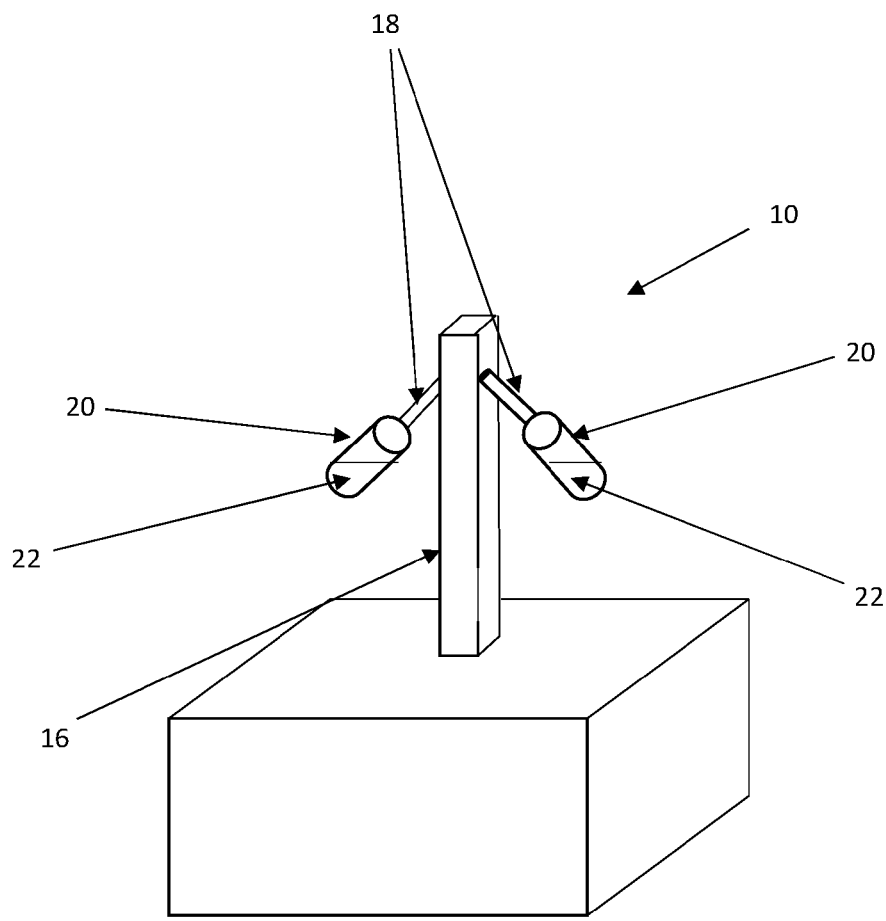
FIG. 2 is an alternative small-scale freeze-drying unit that may be implemented for use in a non-commercial setting.

In an alternative embodiment of the invention shown in FIG. 2, the freeze-drying unit 10 may not include a chamber around the central pole 16, the one or more extensions 18, or the one or more containers 20. The freezing of the liquid material 22 within the container 20 may be performed through the central pole 16 and the extension 18, or the liquid material may be frozen in a separate freezing unit such as a home freezer.

In another alternative embodiment, a vacuum is created within the chamber 26 of the freeze-drying unit 10. Thus, the extensions 18 may only be used to provide a proper angle for the containers 20, and the vacuum and cold temperatures within the chamber 26 enable the freeze-drying process to be performed.

It should be understood that the volume within the chamber 26 may be substantially smaller than that shown, and that FIG. 1 is for illustration purposes only. Thus, the chamber 26 may have tighter dimensions around the container 20.

What may also be important from the embodiments shown in FIGS. 1 and 2 is that as few as a single container 20 of the liquid material 22 may be freeze-dried at a time using a freeze-drying unit 10, and the freeze-drying unit may be of a size that is more compatible with freeze-drying the contents of a single container. The specific shape and arrangement of components of the freeze-drying unit 10 may thus vary from that shown without departing from the scope of the invention.

Figure 3:
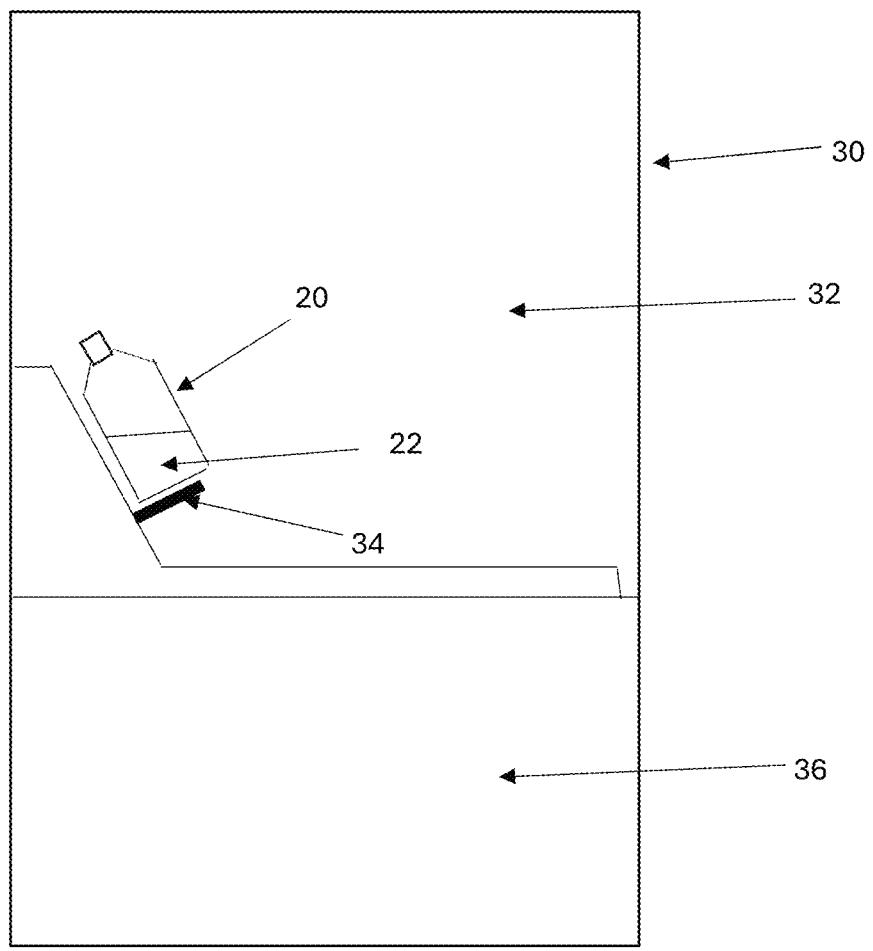
FIG. 3 is an alternative small-scale freeze-drying unit that may be implemented for use in a non-commercial setting.

In another alternative embodiment of the invention shown in FIG. 3, there is no central pole or extensions. FIG. 3 shows that one or more containers 20 are disposed in a top half 32 of a freeze-drying unit 30 and placed on an angled shelf 34. A vacuum pump is disposed within a bottom half 36 and may still be attached to the container 20 to create the vacuum within, but there is no central pole or extensions. The angled shelf 34 creates the desired increase in surface area of the liquid material 22 within the container 20.

In another alternative embodiment, the containers 20 are not disposed at an angle within the freeze-drying units 10 and 30 in FIGS. 1 to 3 but are instead disposed in an upright manner.

Regarding the containers 20, the containers may be comprised of glass or plastic. The material may also be recyclable or disposable. Glass may be selected for closed containers because the strength of the glass may be needed to create the vacuum within the container if that is where the vacuum is formed. In contrast, plastic may be used if the chamber 26 itself is used to form the vacuum and not the container 20.

The containers 20 may be of any desirable shape or size. It is preferable that the shape and size of the container 20 also be conducive to maximizing a surface area of the liquid material 22 during the freeze-drying process. The containers 20 may have a narrow opening or a wide opening and may include a temperature gauge on the container itself to assist in the freeze-drying process. The containers may be comprised of a flexible or rigid plastic material and be disposable. The containers may also contain a visible gauge on the outside of the containers that displays the quantity of the liquid material inside.

Caps that are used to seal the containers may have an opening that is centered or off-set. The caps may be threaded to assist in creating a vacuum seal and enable easy attachment of serving accessories to the containers such as a baby bottle nipple or spoon.

Figure 4:
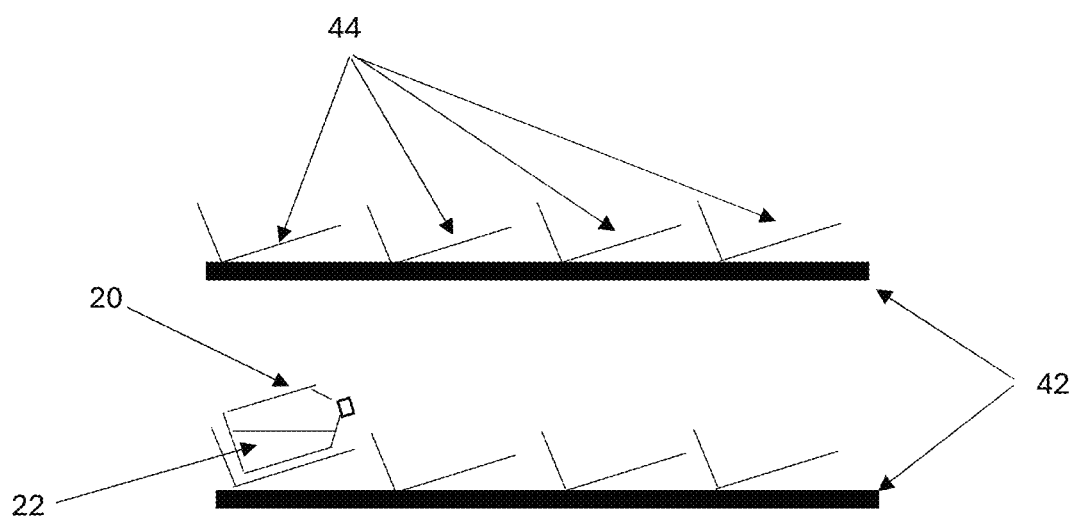
FIG. 4 is a large-scale freeze-drying unit that may be implemented for use in a commercial setting.

In another alternative embodiment of the invention, FIG. 4 shows a large number of containers 20 that may be freeze-dried simultaneously. One modification of a commercial-grade freeze-drying unit is the implementation of trays 42 that may include a plurality of angled shelves 44. The angled shelves 44 may be used to hold the containers 20 at an optimum angle for increasing the surface area of the liquid material 22 within the containers.

Figure 5:
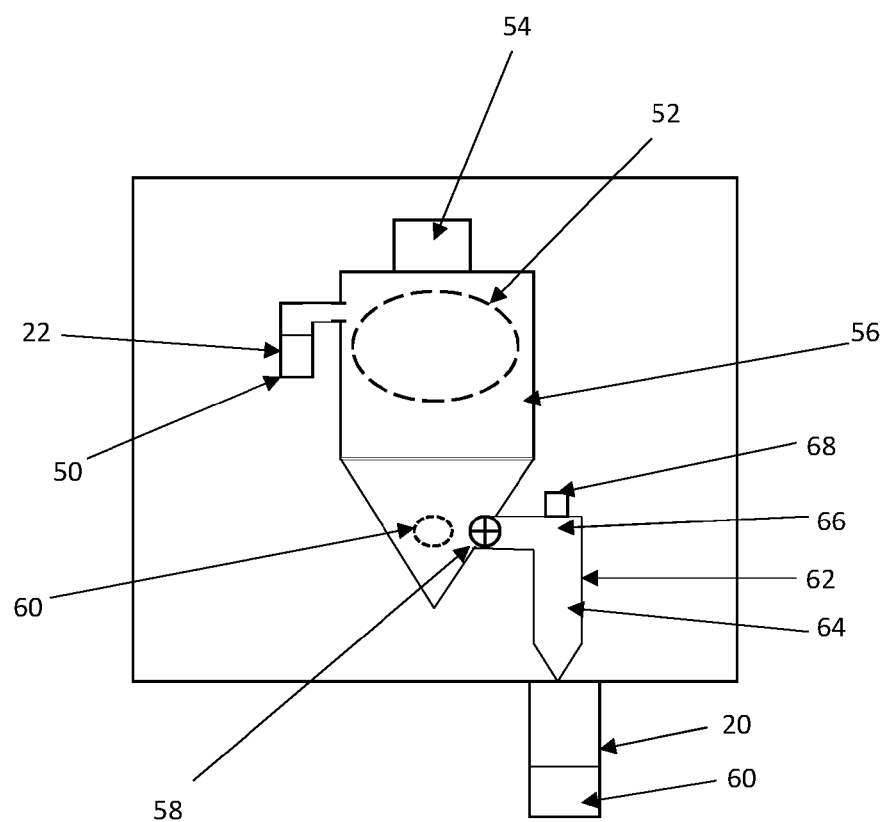
FIG. 5 is a small-scale spray-drying unit that may be implemented for use in a non-commercial setting.

In another alternative embodiment of the invention, FIG. 5 shows a spray drying system that may be used in place of the freeze-drying process of a liquid material. The spray drying process may include the following steps and apparatus.

First, a liquid material 22 may be poured into an atomizer 50. The atomizer 50 may be used to disperse the liquid material 22 into small droplets 52. Then a drying gas 54 may be injected into a mixing chamber 56 where the atomizer 50 may also inject the small droplets 52 of the liquid material 22. The small droplets 52 of the liquid material 22 are dried in the mixing chamber 56. An exit port 58 from the mixing chamber 56 is used to direct dried particles 60 of the liquid material into an exit chamber 62. A small vortex 64 may be generated within the exit chamber 62 where the vortex separates the dried particles 60 of the liquid material and an exhaust gas 66. The exhaust gas 66 may be vented from the exit chamber 62 through a valve 68, while the dried particles 60 are collected at the bottom of the exit chamber. The dried particles 60 may then be collected and stored for future rehydration and use.

It should be understood that the spray drying process described above is only one possible implementation of a spray drying process, and various modifications to the process and system may be made to accomplish the same purpose of drying a liquid material to obtain dried particles without departing from the scope of the invention.

Figure 6:
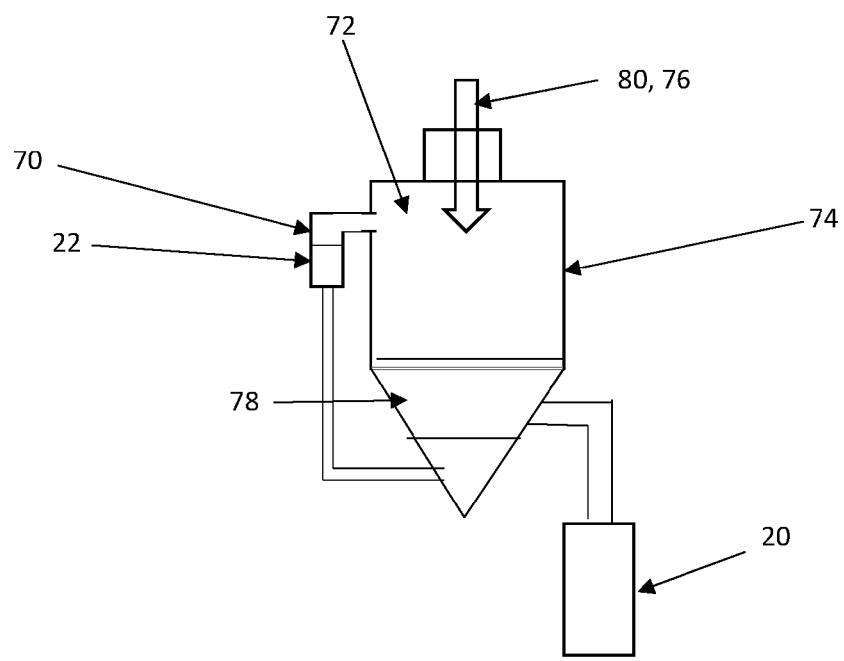
FIG. 6 is a small-scale spray and freeze-drying unit that may be implemented for use in a non-commercial setting.

In another alternative embodiment of the invention, FIG. 6 shows a combined spray and freeze-drying process. The first step may be to pour the liquid material 22 into an atomizer 70 for dispersing the liquid material into small droplets 72. The next step may be to freeze the small droplets 72 of the liquid material as they are injected into a mixing chamber 74. The small droplets 72 are frozen by way of the injection of a freezing gas 76 into the mixing chamber 74.

The freezing gas 76 may be comprised of any appropriate gas that may freeze the small droplets 72 in the mixing chamber 74. Possible freezing gases may include but should not be considered as limited to nitrogen, carbon dioxide or helium.

The frozen small droplets 72 may accumulate on a bottom region 78 of the mixing chamber 74. A drying gas 80 may then be injected into the accumulated frozen small droplets 72 to thereby dehydrate them. The drying gas 80 may be injected at the same location where the freezing gas 76 was injected. The drying gas 78 and the freezing gas 76 may both be injected at the same time or at different times or at alternating times.

The drying gas 80 may be comprised of any appropriate gas that can dry the droplets in the mixing chamber. Possible drying gases may include but should not be considered as limited to nitrogen, carbon dioxide and helium.

The dried small droplets 72 may then be extracted from the bottom surface 78 of the mixing chamber 74 and collected for later use.

It should be understood that while the embodiments of the invention are specifically directed to the freeze-drying or spray-drying of breast milk, any liquid or mostly liquid material may be used in the systems or processes described in the embodiments.

It should also be understood that some of the embodiments of the invention are directed specifically to providing an optimized system and method for freeze-drying or spray-drying of breast milk at home. Accordingly, the system and apparatus is intended to provide an economical system and method for performing freeze-drying or spray-drying of breast milk on a small scale that enables a person to be able to preserve breast milk on a small scale. However, the same system and method may also be adapted to perform the freeze-drying or spray-drying of breast milk on a larger scale, such that a system may be implemented to preserve breast milk by a hospital or other repository of breast milk.

The embodiments above are directed to the process of freeze-drying a liquid material on a small or large scale. The embodiments below are directed to the containers that may be used for freeze-drying and for delivery of the rehydrated materials to a child or infant.

The embodiments of the invention may include a delivery system for feeding a child or infant. The delivery system may be a system for enabling a user to receive a freeze-dried product in a single-use container, rehydrate the freeze-dried product in the single-use container, and then deliver the rehydrated product for consumption from the single-use container. The advantage of performing all of the freeze-drying, rehydrating and delivery from the same container is a substantial decrease in the likelihood of contamination of the freeze-dried material.

Figures 7A, 7B:
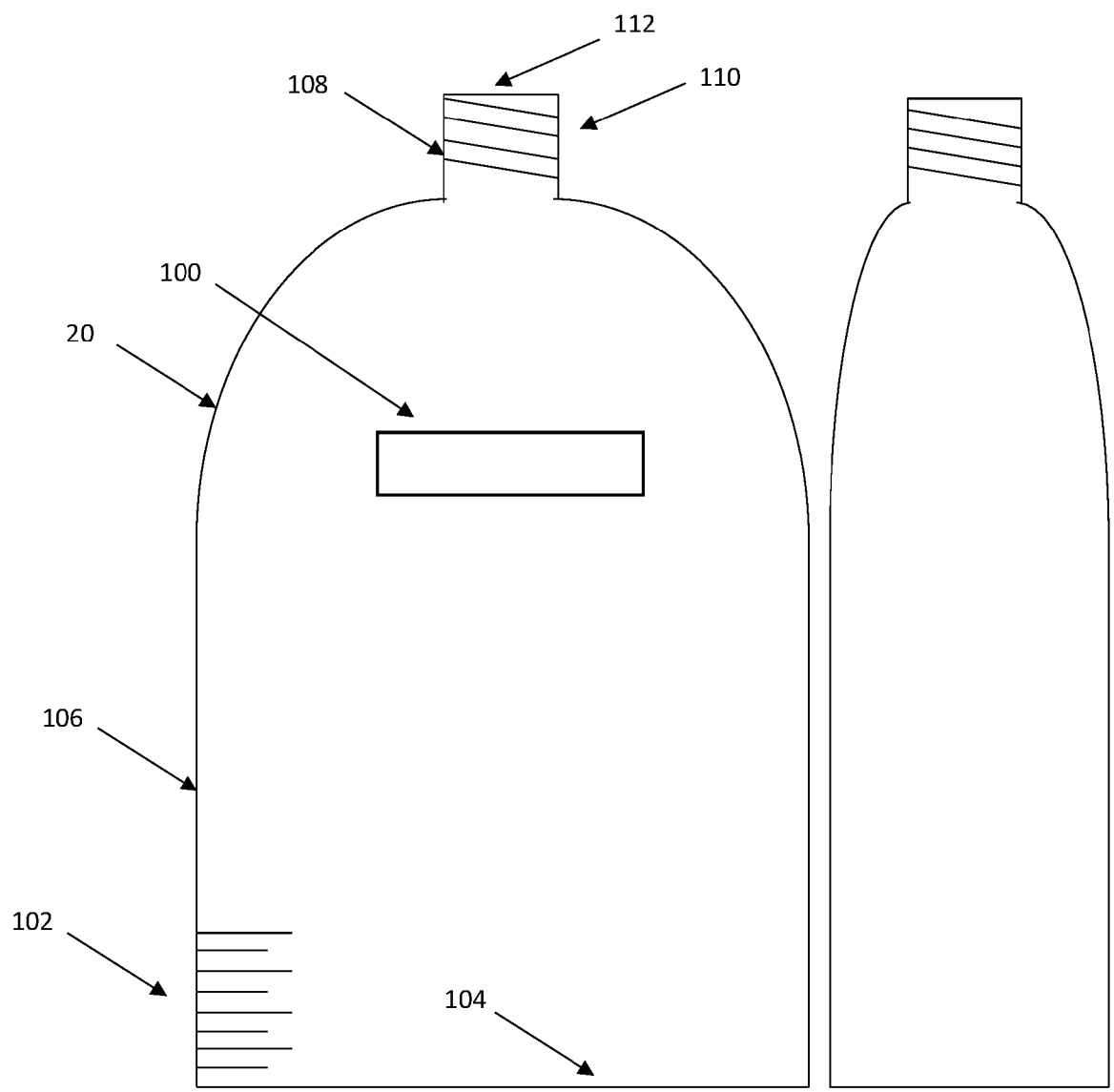
FIG. 7A is a first embodiment of a single-use container that may be used for freeze-drying a liquid, storing the freeze-dried liquid, rehydrating the freeze-dried liquid and then delivering the rehydrated liquid.
FIG. 7B is a side profile view of the first embodiment of the single-use container in FIG. 7A.
Figure 7C:
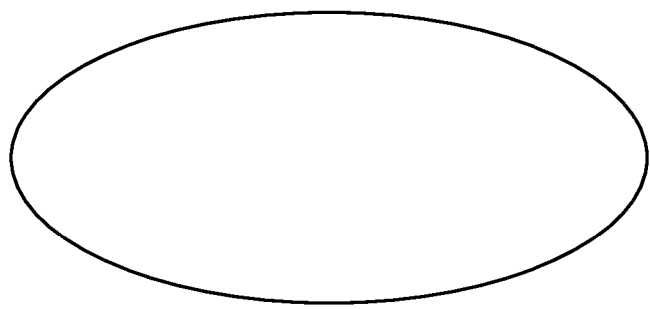
FIG. 7C is a bottom view of the first embodiment of the single-use container in FIG. 7A.

A first embodiment of the single-use container is shown in FIGS. 7A-7C. FIG. 7A is a front or back view of the single-use container. FIG. 7B is a profile of the single-use container 20, and FIG. 7C is a bottom view of the single-use container 20.

The single-use container 20 may be comprised of recyclable plastic or glass or any other material that is suitable for the purpose of the container. The container may also include a labeling space 100 that is designated for indicating the contents, dates or whatever information may be useful to the user of the freeze-dried product.

The single-use container 20 may be capable of standing upright to facilitate the rehydration process, measuring the contents of the container and/or for convenience of use. The single-use container may be collapsible or it may be rigid, depending on the materials used. However, any material that is recyclable and rigid or collapsible may be appropriate and should not be considered a limitation of the embodiments.

The single-use container 20 may also include a measurement guide 102 as shown on the side of the container in FIG. 7A in order to function as a guide to the user that is preparing the freeze-dried product for use. The measurement guide 102 may be used to determine how much water or other liquid has been added to the freeze-dried product as it is being rehydrated.

The first embodiment of the single-use container 20 shows that the shape of the container may be similar to many bottles or containers of liquid products, and may be in the form of a flattened oval and include a substantially flat bottom surface 104, straight sides 106 and then tapering in a gradual curvature to the top where a neck 108 is formed. The neck 108 may be threaded and terminate in a circular opening 112.

It is noted that when there are references to a threaded neck, alternatively another mechanism may also be used in place of threads. For example, a friction fit or a snap mechanism may also be used in place of threads and should be considered as falling within the scope of the invention.

It is observed that while the shape and design of the neck 108 is important, the shape and design of the container is less so. It is only critical that the single-use container 20 include a neck 108 with an opening that is capable of being fitted to another container that includes a rehydrating liquid. The first embodiment accomplishes this by making a circular opening 112.

It is noted that the single-use container 20 may be many different shapes, including tubular, and it may also include handles. Any shape that performs as desired may be considered to be within the scope of the embodiments of the invention.

While it has been explained that the single-use container 20 may be made of materials that are recyclable, alternatively, the container may be a reusable container that may be cleaned and used again. However, the issue of sterilization may have to be addressed for any re-used containers 20.

Figure 8:
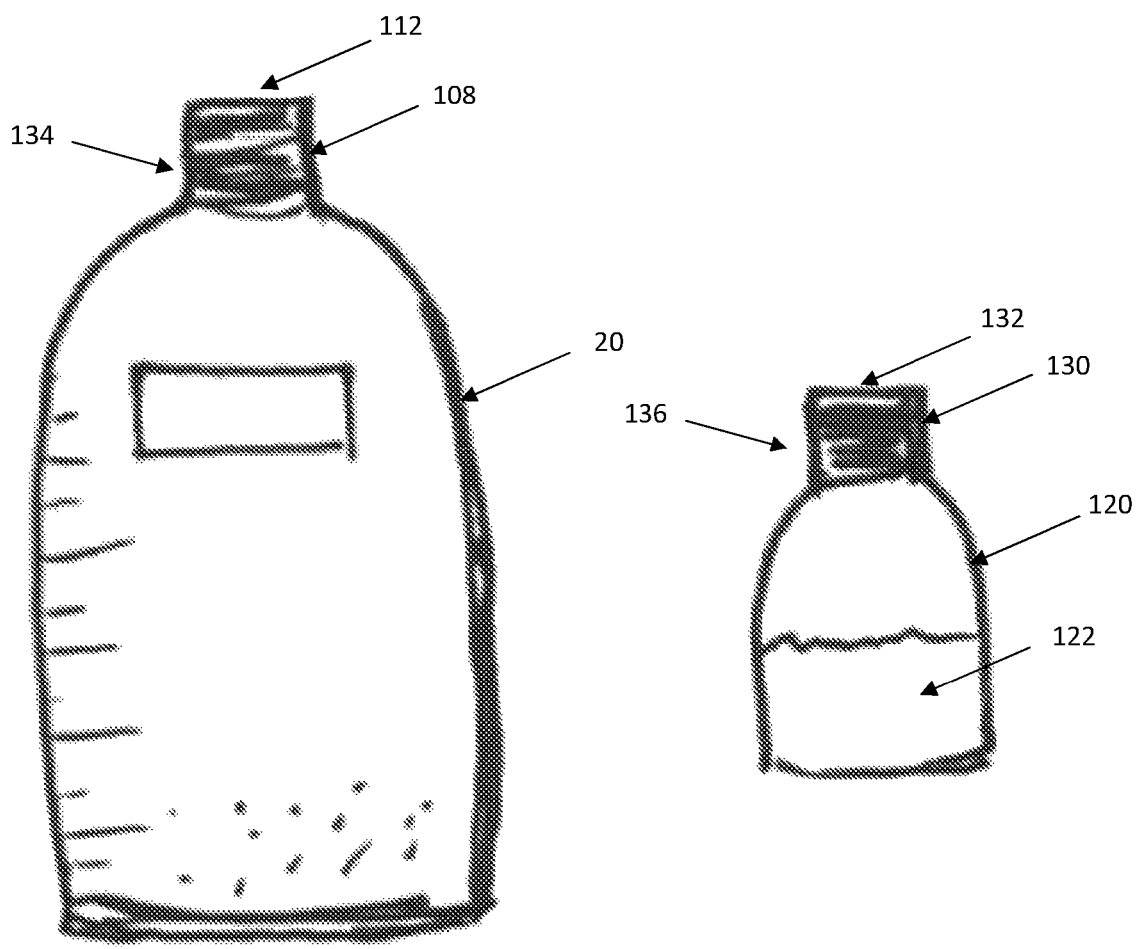
FIG. 8 is a profile view of the single use container and a rehydration container.

FIG. 8 is a front view of the single-use container 20 and a smaller rehydrating container 120 having a neck 130 and circular opening 112. The rehydrating container is shown having a rehydrating liquid 122 inside. In FIG. 8, both the single-use container and the rehydrating container have a cap 134 and 136 on the circular openings 112 and 132.

It should be understood that the rehydrating liquid 122 is typically water but that it may be any desired rehydrating liquid.

Figure 9A:
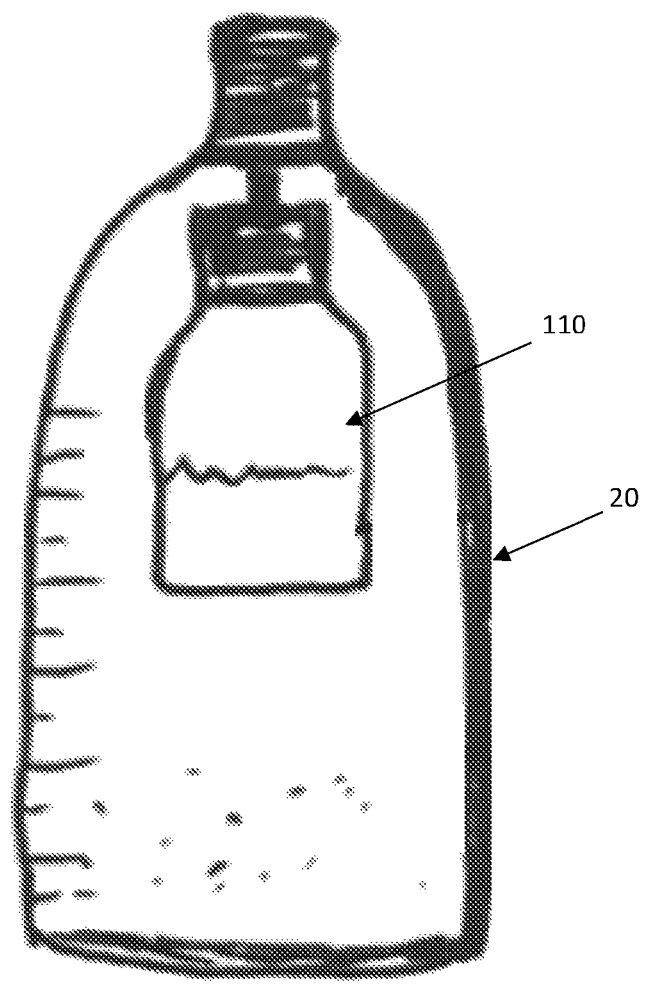
FIG. 9A is a profile view of the rehydration container attached to the single-use container using a ring attachment.
Figure 9B:
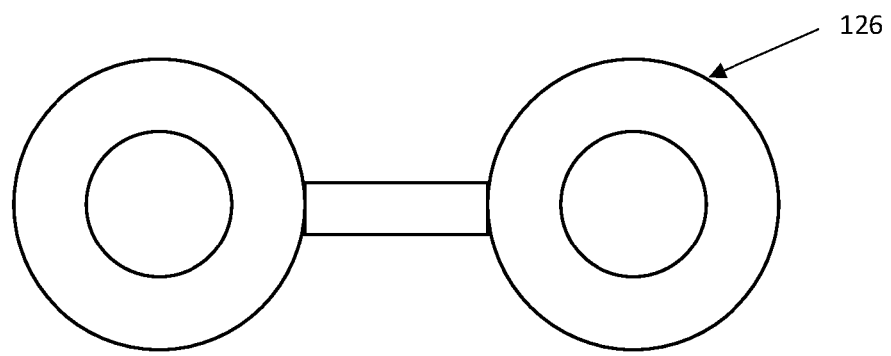
FIG. 9B is a close-up top view of the ring attachment shown in FIG. 9A.

FIG. 9A is an illustration of one method of packaging the single-use container 20 and the rehydrating container 110. The rehydrating container 110 is shown attached to the single-use container. FIG. 9B is a top view of a ring attaching device 126 that can be attached to the single-use container 20 and the rehydrating container 110 by a circular opening at both ends of the ring attaching device.

It may be an advantage to provide both the single-use container 20 and the rehydrating container 110 to a user. First, the liquid in the rehydrating container may be sterile. This may be an important feature when the single-use container is being used for breast milk. Second, the rehydrating container may have the proper amount of liquid for rehydrating, as it may be important to not use too much or too little liquid when rehydrating the contents of the single-use container.

Figure 10:
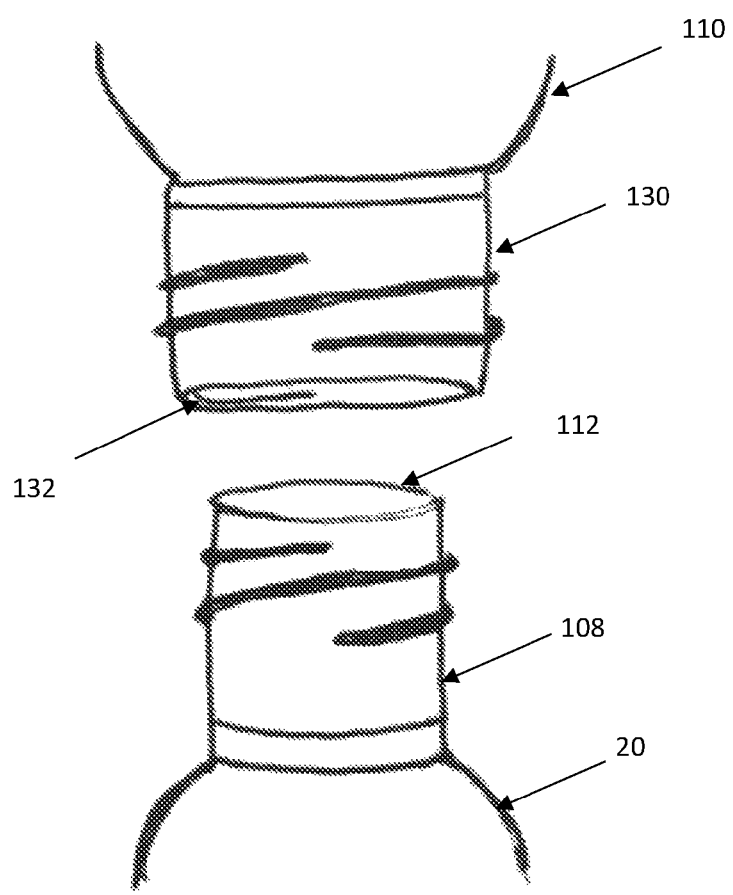
FIG. 10 is a profile view of the single-use container before it is attached to the rehydration container using threaded necks.

FIG. 10 is a perspective view of the neck 108 and the circular opening 112 of the single-use container 20 and the neck 130 and circular opening 132 of the rehydrating container 110. In this first embodiment of the container, the neck 108 and the circular opening 112 of the single-use container 20 may be made to industry standard dimensions. In contrast, the neck 130 and the circular opening 132 of the rehydrating container 110 may be larger than the neck 108 and the circular opening 112 of the single-use container 20.

Figure 11:
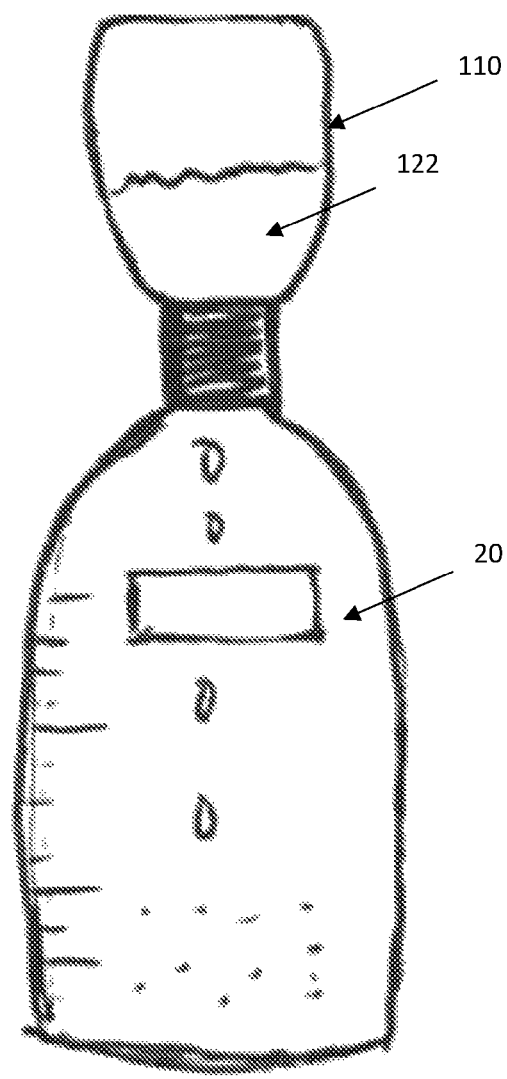
FIG. 11 is a profile view of the single-use container after it is attached to the rehydration container using threaded necks.

As shown in FIG. 11, the purpose for this difference in size may be so that the circular opening 132 of the rehydrating container 110 may be just large enough to fit over and securely screw onto the circular opening 112 of the single-use container 20. In this way, the rehydrating liquid 122 may be safely poured from the rehydrating container 110 and into the single-use container 20 without spilling or contaminating the freeze-dried contents of the single-use container. Alternatively, the circular opening 112 of the single-use container 20 may be just large enough to fit over and securely screw on to the circular opening 132 of the rehydration container 110.

Figure 12:
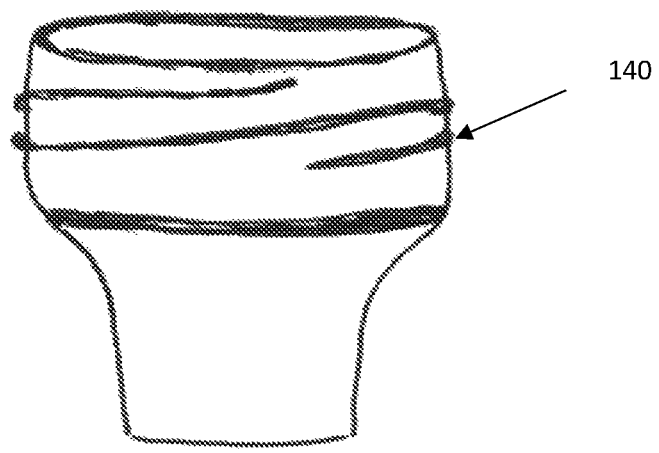
FIG. 12 is a profile view of an accessory adapter for use with the single-use container.

FIG. 12 is a perspective view of an accessory adapter 140 for use with the single-use container 20. The accessory adapter 140 may have a first threaded end that is designed to attach to the neck 108 of the single-use container 20. The accessory adapter 140 may also have a second threaded end that has a different diameter than the first threaded end so that an accessory may be attached to the accessory adapter.

FIGS. 13A and 13B illustrate the use of the accessory adapter 140. The accessory adapter 140 may be attached to the single-use container 20 using the first threaded end. Then a baby bottle nipple 142 conforming to industry standards of size and having a first threaded end may be attached to the accessory adapter 140 using the second threaded end to create the single-use container 20 with accessory adapter 140 and baby bottle nipple 142 shown in FIG. 13B.

It should be understood that the baby bottle nipple 142 is only one type of serving accessory that may be attached to the single-use container 20. For example, another serving end on the serving accessory may be a spoon for use when the rehydrated contents of the single-use container 20 are not a liquid but a material that has a consistency that is thicker than a liquid and which may require the user to squeeze the contents from the single-use container 20.

Figure 14:
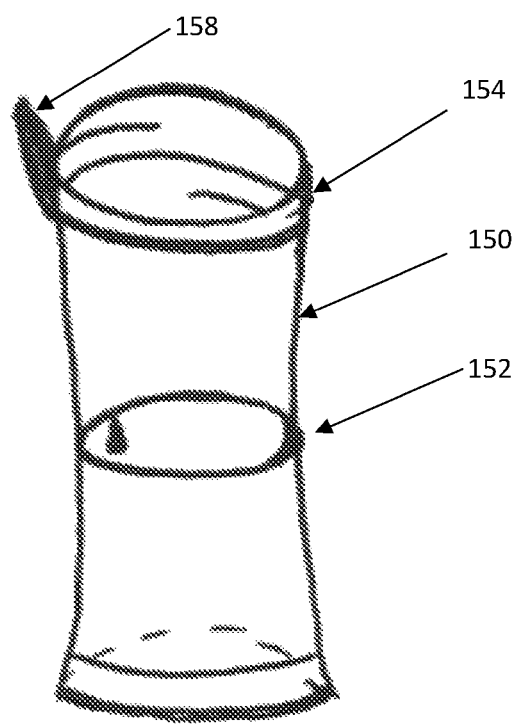
FIG. 14 is a profile view of a container adapter.

FIG. 14 is a perspective view of another embodiment for attaching the single-use container 20 to the rehydrating container 110. FIG. 14 shows a first embodiment of a container adapter 150 that may be shipped with the single-use container 20 and the rehydrating container 110. The container adapter 150 may be shipped in an attached position where it is attached to the single-use container 20 at a first threaded end and to the rehydration container 110 at a second threaded end, or it may be shipped unattached, but ready for attachment.

In the middle of the container adapter 150 may be a straining screen 152. The straining screen 152 may be a safety feature used to strain the contents of the rehydration container 110 as the rehydrating liquid is poured into the single-use container 20. While not required, the straining screen 152 may prevent any particles that were accidentally shipped in the rehydration container 110 from entering the single-use container 20.

The container adapter 150 may also include a pull tab 154, a locking tab 158, and a tamperproof seal at one or both ends when the container adapter is shipped already attached to the single-use container 20 and/or the rehydration container 110. The pull tab 154 may be used to enable the container adapter 150 to be used to deliver the rehydrating liquid to the single-use container 20. The locking tab 158 prevents the container adapter from being removed from the rehydration container 110 once it has been attached. The container adapter 150 may be made of a rigid plastic or other similar and suitable material.

Figure 15A:
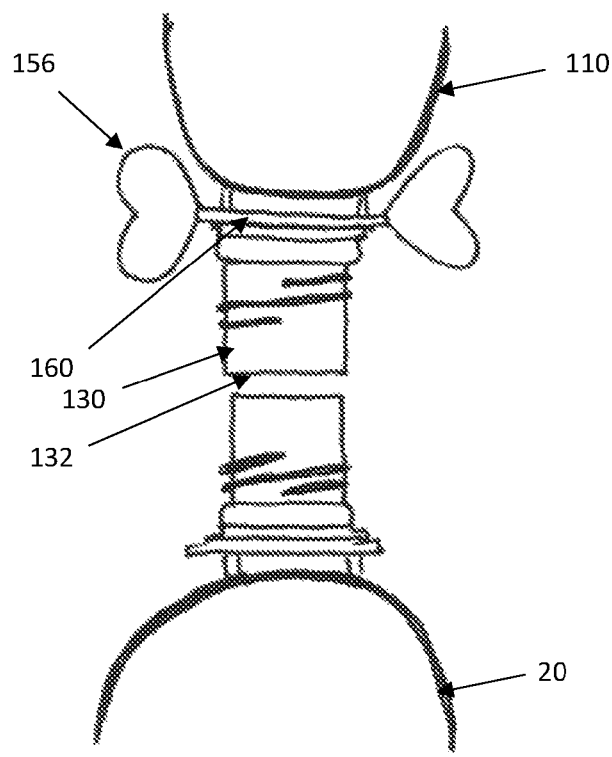
FIG. 15A is a profile view of the single-use container and the rehydration container before they are attached using the container adapter.
Figure 15B:
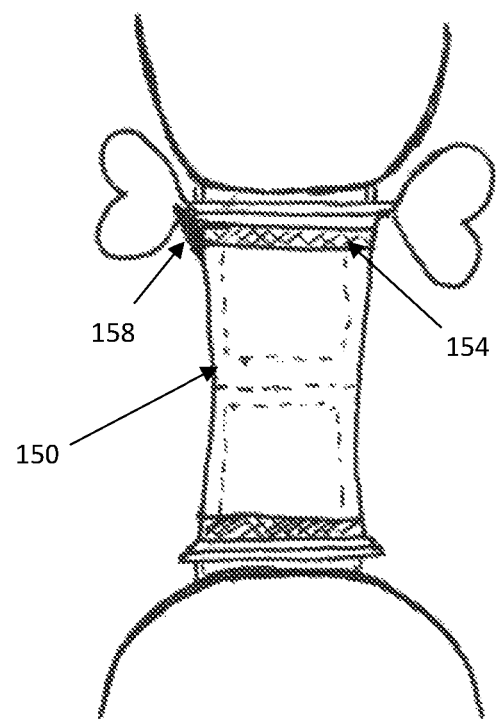
FIG. 15B is a profile view and cut-away view of the single-use container and the rehydration container after they are attached using the container adapter.

FIGS. 15A and 15B show that the rehydration container 110 may include twist flaps 156, with FIG. 15A showing the single-use container 20 and the rehydrating container 110 without the container adapter 150, and FIG. 15B with the container adapter 150. It is noted that the circular openings of the single-use container 20 and the rehydration container 110 may be the same diameter when using the container adapter 150, or they may be different diameters.

A function of the twist flaps 156 may be to rotate a cylindrical bar 160 that is coupled to the neck 130 of the rehydrating container 110. The cylindrical bar 160 may include a sharp edge for piercing a foil or plastic covering near the circular opening 132 of the rehydrating container 110. The twist flaps 156 may be prevented from rotating the cylindrical bar 160 until the pull tab 154 is removed from the container adapter 150.

The first embodiment of a container adapter 150 may operate as follows. First, the container adapter 150 is attached to the single-use container 20 and the rehydrating container 110 using matching threaded ends, making sure that the locking tab 158 is in the correct position such that the container adapter 150 cannot be removed from the rehydrating container. The single-use container 20 may be open at the circular opening 112 if the container adapter 150 is being attached before shipment, or a cap may need to be removed from the circular opening before attachment.

The next step is to remove the pull tab 158. Removal of the pull tab 158 enables the twist flaps 156 to rotate. The twist flaps 156 may rotate at least 90 degrees. The twist flaps 156 may enable a sharp edge to pierce a covering on the rehydrating container 110, or in some way at least partially remove the covering. The rehydrating liquid in the rehydrating container 110 may then flow through the straining screen 152 to the single-use container 20. The container adapter 150 should then be removed by twisting it off the neck 108 of the single-use container 20.

If the container adapter 150 is shipped to a user already in place, then the user should be sure to tear a tamper seal between the container adapter 150 and the single-use container 20 as the container adapter is removed. The user then attaches whatever adapters and serving accessories are needed, and the contents of the single-use container 20 may be mixed by shaking or squeezing, depending on the freeze-dried material that is being stored.

FIG. 15A is a profile view of the neck 108 and the circular opening 112 of the single-use container 20 and the neck 130 and circular opening 132 of the rehydrating container 110. In this embodiment, the single-use container 20 and the rehydrating container 110 may both be the same diameter at the circular opening 112 and the circular opening 132, or they may be different.

Figure 16:
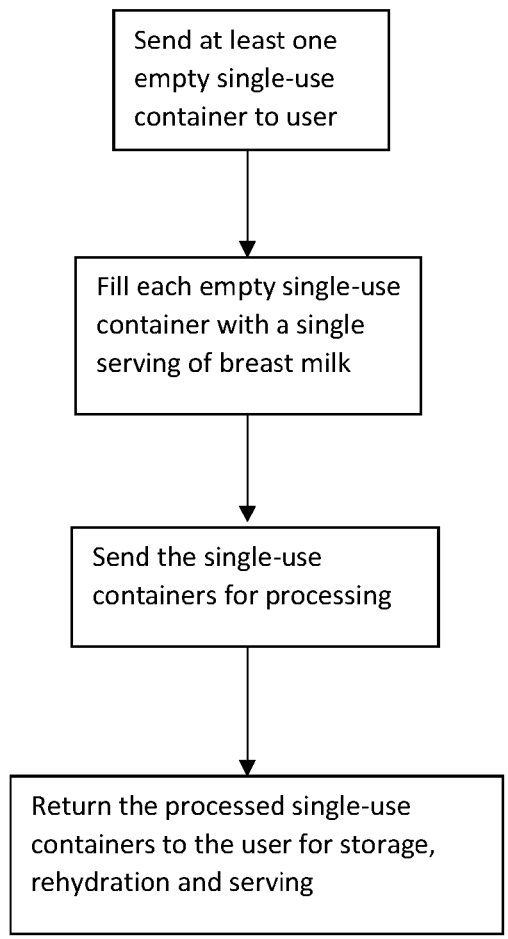
FIG. 16 is a flowchart of a method of using the embodiments of the invention to gather breast milk, process it, and then return it to the sender.

FIG. 16 is a flowchart of a possible method for using the embodiments of the invention described above. The method may include the steps of sending empty single-use containers 20 to a nursing mother or other user such as a hospital or breast milk repository. The user then fills each of the single-use containers with breast milk using whatever means are appropriate. The single-use containers may then be sealed and returned to a manufacturer for processing. The manufacturer processing may include freeze-drying, spray drying, or a combination and spray and freeze-drying the breast milk in each of the single-use containers 20. Thus, the breast milk is never removed from the single-use containers before being dried. The manufacturer then ships the single-use containers back to the user for storage and use as needed.

It should be understood that the business method described above may apply to a single user or to a plurality of users if the user is a breast milk repository or hospital.

It should also be understood that the product that may be freeze-dried, stored, rehydrated and used to feed a person is not limited to breast milk, but may be any product that may benefit from the embodiments of the present invention.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for freeze-drying, rehydrating and delivering a liquid material for feeding, said method comprising:
   providing a first single-use container having a tubular neck with a first circular opening, wherein the neck is threaded, providing a rehydration container having a rigid tubular neck with a first circular opening, wherein the neck is threaded, and wherein the first circular opening of the first single-use container has a different diameter than the first circular opening of the rehydration container, providing an accessory adapter having a first threaded end that attaches to the neck of the first single-use container, and having a second threaded end that is different in diameter than the first threaded end, and providing a serving accessory having a first threaded end that attaches to the second threaded end of the accessory adapter and having a serving end for delivering a rehydrated liquid material;
   opening the first single-use container that contains a freeze-dried material therein;
   opening the rehydration container that has a rehydrating liquid stored therein;
   attaching the first single-use container to the rehydration container by attaching the neck of the first single-use container to the neck of the rehydration container;
   delivering the rehydrating liquid to the first single-use container and rehydrating the freeze-dried material to create a rehydrated material;
   removing the rehydration container from the first single-use container;
   attaching the accessory adapter to the first single-use container; and
   attaching the serving accessory to the accessory adapter and feeding a person the rehydrated material using the serving accessory.

2. The method as defined in claim 1 wherein the method further comprises selecting the serving accessory from the group of serving accessories comprised of a baby bottle nipple and a spoon.

3. The method as defined in claim 2 wherein the method further comprises:
   providing a covering that seals the rehydrating liquid in the rehydration container, and providing at least one twist flap coupled to a cylindrical bar that is coupled to the neck of the rehydration container, and having an edge on the cylindrical bar that can pierce the covering; and rotating the at least one twist flap to thereby rotate the cylindrical bar and cause the edge to tear the covering and release the hydrating liquid.

4. The method as defined in claim 3 wherein the method further comprises disposing a straining screen between the first threaded end and the second threaded end to thereby strain the rehydrating liquid when it passes from the rehydration container to the first single-use container.

5. The method as defined in claim 4 wherein the method further comprises:
   providing a pull tab on the container adapter for releasing the at least one twist flap so that the at least one twist flap may be rotated, and providing a locking tab for locking the container adapter to the rehydration container;
   locking the container adapter to the rehydrating container by twisting the container adapter onto the neck of the rehydrating container; and
   removing the pull tab from the container adapter.

6. The method as defined in claim 1 wherein the method further comprises:
   sending at least one first single-use container that does not contain any material to a user;
   storing breast milk in the at least one of the first single-use container;
   sending the at least one container with breast milk to a processor;
   processing the at least one single-use container with breast milk to thereby create freeze-dried breast milk; and
   returning the at least one single-use container with the freeze-dried breast milk to the user for use.

7. A method for freeze-drying, rehydrating and delivering a liquid material for feeding, said method comprising:
   providing a first single-use container having a rigid tubular neck with a first circular opening, wherein the neck is threaded;
   sending at least one first single-use container that does not contain any material to a user;
   storing breast milk in the at least one first single-use container;
   sending the at least one first single-use container with breast milk to a processor;
   processing the at least one first single-use container with breast milk to thereby create freeze-dried breast milk; and
   returning the at least one first single-use container with the freeze-dried breast milk to the user for use.

8. The method as defined in claim 7 wherein the method further comprises:
   providing a rehydration container having a tubular neck with a first circular opening, wherein the neck is threaded, wherein the first circular opening of the first single-use container has a same diameter as the first circular opening of the rehydration container, and wherein the rehydration container contains a rehydration liquid;
   providing a container adapter, wherein the container adapter has a first threaded end and a second threaded end;
   attaching the first threaded end of the container adapter to the rehydration container and the second threaded end to the first single-use container; and
   delivering the rehydrating liquid to the first single-use container and rehydrating the freeze-dried breast milk to create rehydrated breast milk.

9. The method as defined in claim 8 wherein the method further comprises:
   providing an accessory adapter having a first threaded end that attaches to the neck of the first single-use container, and having a second threaded end that is different in diameter than the first threaded end, and providing a serving accessory having a first threaded end that attaches to the second threaded end of the accessory adapter and having a serving end for delivering rehydrated breast milk;
   removing the container adapter and the rehydrating container from the first single-use container;
   attaching the accessory adapter to the first single-use container; and
   attaching the serving accessory to the accessory adapter; and
   feeding an infant the rehydrated breast milk using the serving accessory.

* * * * *